Figure 1:
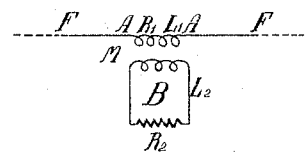

G. CAMPOS.
MEANS FOR PROTECTING ELECTRICAL INSTALLATIONS FROM EXCESS VOLTAGES.
APPLICATION FILED AUG. 19, 1910.

1,017,634.

Patented Feb. 13, 1912.
2 SHEETS—SHEET 1.

Witnesses:

Inventor
Cino Campos
By
James L. Norris, Jr.
Atty

G. CAMPOS.
MEANS FOR PROTECTING ELECTRICAL INSTALLATIONS FROM EXCESS VOLTAGES.
APPLICATION FILED AUG. 19, 1910.

1,017,634.

Patented Feb. 13, 1912.

2 SHEETS—SHEET 2.

UNITED STATES PATENT OFFICE.

GINO CAMPOS, OF MILAN, ITALY.

MEANS FOR PROTECTING ELECTRICAL INSTALLATIONS FROM EXCESS VOLTAGES.

1,017,634.   Specification of Letters Patent.   Patented Feb. 13, 1912.

Application filed August 19, 1910.  Serial No. 578,047.

*To all whom it may concern:*

Be it known that I, GINO CAMPOS, electrical engineer, subject of the Emperor of Austria-Hungary, residing at Milan, Italy, have invented certain new and useful Improvements in Means for the Protection of Electrical Installations from Excess Voltages, of which the following is a specification.

The present invention relates to the protection of electrical installations from the excess voltages which arise in the form of sudden variations in the electrical condition of the conductors or which may be caused by alternating currents and oscillations of high frequency and also by electric wave-fronts which speedily propagate themselves along the conductor. All these phenomena may have their origin both inside and outside the installation and in atmospheric discharges, in resonances between the various parts of the installation, in normal working or finally as a result of accidental phenomena in the installation itself.

The object of the invention is to prevent the propagation of these excess voltages along the conductors or lines by damping their amplitude by means of one or more devices inserted in series relatively to the line on which they are arranged and which considerably increase the ohmic equivalent resistance of the line and consequently the dissipation of energy for the currents of high frequency that it is desired to damp, without thereby appreciably preventing the passage of the normal working currents in the said lines.

Another object it is desired to obtain, is to have in said device no parts connected in shunt either between one conductor and the other of the line on which it is arranged, or between the conductors themselves and the earth; so that it is possible to employ this device also for lines at very high tension without a very strong insulation between the various parts and without risk of short circuiting or derivation among the line wires.

In accordance with the present invention these various objects are attained by producing induction or Foucault currents in one or more circuits or conductors adjacent to the conductor through which the excess voltages tend to become propagated and directly connected with said conductor or electro-magnetically coupled with it, by means of the current which passes through the said conductor itself. And that is obtained in such a manner that the "apparent ohmic resistance" of the system composed of correspondent length of the primary conductor or circuit and of this or these secondary conductors or circuits, increases with the frequency of the variable current produced by the excess voltages. Consequently the same thing occurs as regards the loss of energy or the damping of the high frequency currents along their path, but the passage of the normal working currents of the installation is influenced but in a practically negligible manner.

Figure 2:
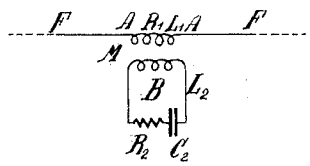
Figure 3:
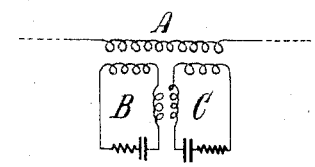
Figure 4:
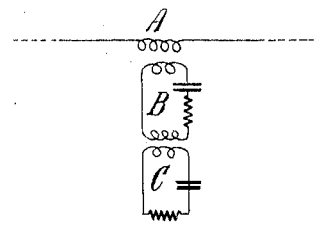
Figure 5:
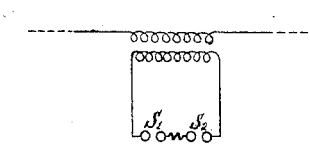
Figure 6:
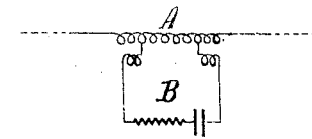
Figure 7:
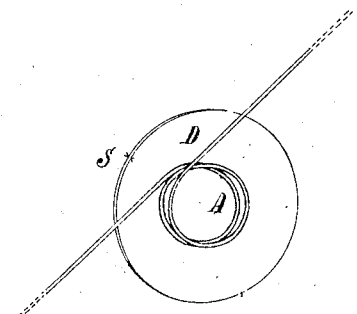
Figure 8:
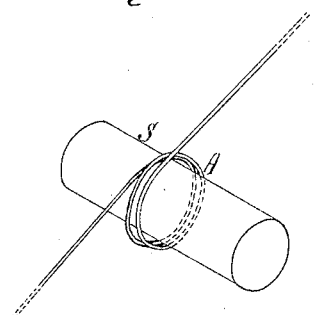
Figure 9:
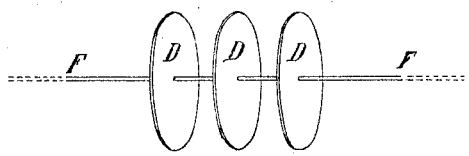

Figure 1 shows by way of example a diagram of one of the devices in accordance with the present invention, wherein a line circuit is interlinked with a simple secondary. Fig. 2 shows a diagram of one of the devices wherein a finite value of the secondary capacity is selected. Fig. 3 shows a diagram of one of the devices wherein secondary circuits B and C comprising capacities possessing a finite value are utilized. Fig. 4 shows a diagram of one of the devices wherein two secondary circuits are shown the first of said secondary circuits being directly operated by the primary circuit and the second by the first secondary circuit. Fig. 5 shows a diagram wherein two spark gaps are utilized, the ohmic resistance of the metallic length connected with said spark gaps is small, and where the capacity of the conductor has a limited value. Fig. 6 shows a diagram wherein the secondary circuits are interconnected and wherein there is an auto-transformer operated by the primary circuit. Fig. 7 shows a metallic plate, one of whose faces is held near the primary circuit. Fig. 8 shows a secondary circuit consisting of a cylindrical or tubular core which enters the primary circuit and reacts upon the latter. Fig. 9 shows a secondary circuit consisting of a series of conducting plates threaded on the primary circuit.

Referring to Fig. 1 the conducting length A A having an ohmic resistance $R_1$ and an inductance $L_1$ is connected in series with the line conductor F F. Next to this length of the conductor there is a secondary circuit B provided with an ohmic resistance $R_2$, an inductance $L_2$ and presenting a coefficient M of mutual induction with the primary circuit. As is known the "apparent ohmic resistance" of this system for alternating currents of the frequency $$\frac{\omega}{2\pi}$$

is:

$$R = R_1 + \frac{\omega^2 M^2 R_2}{R_2^2 + \omega^2 L_2^2}$$

and similarly the "equivalent inductance" is:

$$L = L_1 - \frac{\omega^2 M^2 L_2}{R_2^2 + \omega^2 L_2^2}.$$

From this it will be seen that when the primary current is a continuous current or has a sufficiently low frequency, the secondary current exerts no influence on the primary current, but that when the frequency of the primary current is very high, the apparent ohmic resistance of the system increases and approaches the limit value $$R = R_1 + \frac{M^2 R_2}{L_2^2}$$

while its equivalent inductance decreases and approaches the limit value:

$$L = L_1 - \frac{M^2}{L_2}.$$

In addition to this it will be noted that this reaction of the secondary circuit on the primary circuit increases with the increase of the co-efficient of the mutual induction M and consequently it is advisable to make this rather large by an adequately close coupling of the two systems. For example, if $L_1 = 0.0005$ henry, $L_2 = 0.001$ henry, $M = 0.0006$ henry, $R_2 = 300$ ohm and the primary resistance $R_1$ can be regarded as unimportant:

For $\omega = 2\pi \times 50$ ...... R = negligible
For $\omega = 2\pi \times 5000$ ..... R = 1.17 ohm (about)
For $\omega = 2\pi \times 50000$ ... R = 56.5 ohm (about)
For $\omega = 2\pi \times 500000$ .. R = 106.2 ohm (about)

In the latter case it must therefore be assumed that R has already attained its practical limit value.

The following are the values of the "equivalent inductance".

For $\omega = 2\pi \times 50$ ...... L may be regarded as unaltered in practice.
For $\omega = 2\pi \times 5000$ ... L decreases of about $3.9 \times 10^{-6}$ henry.
For $\omega = 2\pi \times 50000$ .. L decreases of about $1.87 \times 10^{-4}$ henry.
For $\omega = 2\pi \times 500000$ . L decreases of about $3.6 \times 10^{-4}$ henry, that is to say in the latter case it must be assumed that L has already reached its practical limit value.

If appropriate values of $L_1$ $L_2$ M and $R_2$ are selected according to each particular case, the result can be attained that the system, even when traversed by alternating currents, presents only a small inductance and a very small ohmic resistance for the normal frequencies. On the other hand the value of the apparent resistance for the high frequencies corresponding to the excess voltages or the sudden alterations in the electric condition of the conductor may be considerably higher; and this same thing occurs with the loss of energy along the path of the oscillations or electrical variations propagating themselves along the conductor and with the damping thereof. As the value of the equivalent inductance simultaneously decreases for the high frequencies, with the system thus arranged, the value of the interference or reflection of the electric waves and of the consequent disturbances increasing the voltage will relatively decrease. The storing of electro-magnetic energy which acts against the ohmic resistance and tends to assist the propagation of the excess voltages is thereby also relatively reduced.

In connection with what has been stated it must be remembered that the values of $L_1$ $L_2$ M $R_2$ cannot be regarded as constant magnitudes because with high frequencies they may vary, especially in view of the known phenomenon of superficial flow or "skin effect."

A similar result to that in the case considered above can also be obtained by a suitable selection of the values when a not negligible value is ascribed to the resistance $R_1$ and also when, as in the case illustrated in Fig. 2, a finite value of the secondary capacity is selected. Then instead of a variation always in one and the same direction of the values of R and L, a zone of maximum effect for a given extension of the frequency can be obtained. There might also be a plurality of secondary circuits for one and the same primary circuit, either independent one of the other or with direct mutual action. In Fig. 3 two of these secondary circuits B and C are represented diagrammatically and in the case in question they comprise capacities possessing a finite value. It is also possible to have a number of secondary circuits connected in cascade as in the example illustrated in Fig. 4, where two secondary circuits are shown, the circuit B being directly operated by A and the circuit C by B.

It should be noted that in order to facilitate the loss of energy in the case of high frequencies, the value of all or some of the ohmic resistances of the secondary circuit must not only be made not negligible but intentionally high. Further, in order to prevent the possibility of a free oscillation of the system which might produce electrical oscillations and consequently resonances or excess voltages along the line it may also be advantageous for the value of these resistances not to be smaller than the minimum values which make the system aperiodic.

The ohmic resistance of the circuit B in Fig. 1 or of all or some of the secondary circuits of the other figures or the like can also comprise the resistance of one or more sparks when the conductor in question is supposed interrupted in order to form one or more spark gaps; in which case the arrangement of Fig. 2 turns up into the example of Fig. 5 where two spark gaps $S_1$, $S_2$ are shown and where the ohmic resistance of the metallic length connected with the latter may be very small and where the capacity of the conductor in question must be considered as possessing a limited value. The secondary circuit or circuits can also be metallically connected with the primary circuit or one with the other, or be interconnected as in the example illustrated in Fig. 6 which shows an auto-transformer B operated by the primary circuit A and comprising an ohmic resistance and a condenser.

Even when the secondary circuit is not an actual circuit represented by clearly defined elements, which has been stated above applies fully; for example, when induction currents in the form of Foucault currents arise in one or more metallic or other conducting masses, suitably connected with the primary circuit or situated near it; whereby the primary circuit can be wound as a coil or be rectilinear or constructed in any other manner. In Fig. 7 for example is shown a metallic plate D, whose thickness is S, having one of its faces held near the primary circuit A; such a device can be considered as a secondary short circuited on itself. Then again, as in Fig. 8, the secondary circuit can also be a cylindrical or tubular conducting core B which enters the primary circuit A and reacts upon this by means of Foucault currents produced by itself. Finally the secondary circuit may consist of a series of conducting plates D D D (Fig. 9); threaded on the primary circuit F F and metallically connected therewith or not. Said plates can also be closer together than is shown in the figure for the sake of clearness and form with the primary a kind of single transversely laminated conductor, with thin insulated sheets, presenting a longitudinal uninterrupted path, which latter is shown in the figure as an axial conductor for the primary and line current. In this case the effect of the Foucault currents can combine with the known phenomenon of superficial flow or "skin effect." In point of fact while the normal working currents of the line traverse the conductor arranged axially, the currents corresponding to the excess voltages, owing to the counter action of the induction currents existing in the plates, are obliged to slip along the surface (which should preferably be formed of a magnetic material and in any case with a high specific resistance) of the conductor composed of the plates. Consequently the currents undergo a powerful damping action and eventually they will jump from one plate to the next (when the spaces are sufficiently small) and so will be dissipated in the form of sparks. The plates may be very thin, only some tenths of a mm. for example. Obviously also in the cases illustrated in Figs. 7, 8 and 9 both the primary and the secondary circuit can be formed and arranged in a different manner from that shown in these figures by way of example. The conducting material forming the secondary masses can likewise be magnetic because in this manner the losses of energy by magnetic hysteresis (which losses increase with the increase of the frequency) become combined with the loss owing to the induction of Foucault currents and the total loss of energy and the damping of the high frequency primary currents to be damped increase. Care must be taken, however, that the auto-induction of the primary circuit is not increased excessively. At the same time the secondary masses can eventually be composed of laminated conductors or otherwise sub-divided in such a manner that the induction currents do not prevent the penetration of the magnetic induction and eventually the magnetic hysteresis in the interior of these masses. It is also obvious that in all above cases and, generally speaking, in all cases which can arise from the arrangements described above, the values of R and of L for each separate case can be determined experimentally directly or indirectly by known methods, in cases where the various values relating to the circuits in question cannot be expressed in invariable magnitudes (for example when they vary with the frequency or have reference to magnetic materials or when the corresponding expressions are not easy to be mathematically stated). One, two, or more such devices can be connected with one and the same conductor either at the ends of the conductors or along the conductor at a suitable interval one from the other.

It will be understood from the above that the arrangements in question present no parts in shunt either between the various wires or conductors of an electric line or between these and the earth; as a matter of fact in the accompanying drawing only one wire is shown upon which the device is arranged. Consequently it is here impossible, even in the case of damage to the system, for short circuits among the line wires or with the earth to take place. The system complies therefore with the requirements of insuring a free passage for the normal working currents and of dissipating the energy of high frequency currents and consequently of increasing the damping thereof in their passage and it comprises no element which could prejudicially affect the efficient operation or its certainty.

What I claim and desire to secure by Letters Patent of the United States is:—

In means for protecting electrical installations from excess voltages, the combination with line conducting means, of a conducting length provided with an ohmic resistance and inductance and connected in series with the said line conducting means, and a secondary circuit associated with the conducting length and having a greater ohmic resistance and inductance for the purpose specified.

In testimony whereof I affix my signature in presence of two witnesses.

GINO CAMPOS.

Witnesses:
CHAS. H. LOSCHER,
ENRICO VERONELLI.